United States Patent
Hazay et al.

(10) Patent No.: US 11,089,049 B2
(45) Date of Patent: Aug. 10, 2021

(54) SYSTEM, DEVICE, AND METHOD OF DETECTING CRYPTOCURRENCY MINING ACTIVITY

(71) Applicant: Allot Communications Ltd., Hod HaSharon (IL)

(72) Inventors: Alon Hazay, Ramat HaSharon (IL); Asaf Shahar, Kfar Saba (IL)

(73) Assignee: ALLOT LTD., Hod Hasharon (IL)

( * ) Notice: Subject to any disclaimer, the term of this patent is extended or adjusted under 35 U.S.C. 154(b) by 659 days.

(21) Appl. No.: 15/987,926

(22) Filed: May 24, 2018

(65) Prior Publication Data

US 2019/0364057 A1 Nov. 28, 2019

(51) Int. Cl.
*H04L 29/06* (2006.01)
*H04W 28/10* (2009.01)
*H04L 12/801* (2013.01)
*H04W 24/08* (2009.01)

(52) U.S. Cl.
CPC ........... *H04L 63/145* (2013.01); *H04L 47/10* (2013.01); *H04L 63/0227* (2013.01); *H04L 63/1416* (2013.01); *H04L 63/1425* (2013.01); *H04W 24/08* (2013.01); *H04W 28/10* (2013.01)

(58) Field of Classification Search
CPC ............... H04L 63/145; H04L 63/1425; H04L 63/1416; H04L 47/10; H04L 63/0227; H04L 9/3239; H04L 2463/144; H04L 2209/38; H04W 28/10; H04W 24/08
See application file for complete search history.

(56) References Cited

U.S. PATENT DOCUMENTS

| | | | |
|---|---|---|---|
| 9,104,873 B1* | 8/2015 | Chen | G06F 21/566 |
| 9,542,554 B1* | 1/2017 | Salsamendi | G06F 21/566 |
| 10,628,586 B1* | 4/2020 | Jung | G06F 21/52 |
| 2015/0341246 A1* | 11/2015 | Boubez | H04L 41/0883 709/224 |
| 2016/0044054 A1* | 2/2016 | Stiansen | H04L 63/1416 726/24 |
| 2016/0065597 A1* | 3/2016 | Nguyen | H04L 63/1408 726/22 |
| 2016/0381070 A1* | 12/2016 | Zhang | H04L 63/1408 726/23 |
| 2018/0091526 A1* | 3/2018 | Cammarota | H04L 63/145 |

* cited by examiner

*Primary Examiner* — Kendall Dolly
(74) *Attorney, Agent, or Firm* — Eitan Mehulal Sadot

(57) ABSTRACT

A system monitors network activity of an end-user device that communicates with servers over a communications network. The performs analysis of packets of data that are transported via the network. The system detects a first set of communications in which a first server infects the end-user device with a cryptocurrency mining malware; a second set of communications, in which a second server activates the end-user device as an activated cryptocurrency mining bot; and a third set of communications, in which the second server allocates a cryptocurrency mining task to the end-user device and later receives a cryptocurrency mining output from the end-user device. The system determines that the first server is a malicious infecting web-server; that the second server is a malicious Command and Control server of a distributed bot-net of cryptocurrency mining bots; and that the end-user device is an infected and activated and operational cryptocurrency mining bot.

30 Claims, 2 Drawing Sheets

SYSTEM, DEVICE, AND METHOD OF DETECTING CRYPTOCURRENCY MINING ACTIVITY

FIELD

The present invention relates to the field of telecommunication systems.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments of the present invention may provide systems, devices, and methods of detecting cryptocurrency mining activity. For example, a system monitors network activity of an end-user device that communicates with one or more servers over a cellular communication network. The system performs analyzing of packets of data that are transported via the cellular communication network. Based on the analyzing, the system detects a first set of communications in which a first server infects the end-user device with a cryptocurrency mining malware; the system detects a second set of communications, in which a second server activates the end-user device as an activated cryptocurrency mining bot; and the system detects a third set of communications, in which the second server allocates a cryptocurrency mining task to the end-user device and later receives a cryptocurrency mining output from the end-user device. Based on these detecting operations, the system determines that the first server is a malicious infecting web-server; determines that the second server is a malicious Command and Control (C&C) server that commands and controls a distributed bot-net of cryptocurrency mining bots; and determines that the end-user device is an infected and activated and operational cryptocurrency mining bot. The system then performs remedial actions or corrective actions or damage-reducing actions.

The present invention may provide other and/or additional advantages and/or benefits.

DETAILED DESCRIPTION OF SOME DEMONSTRATIVE EMBODIMENTS

Figure 1:
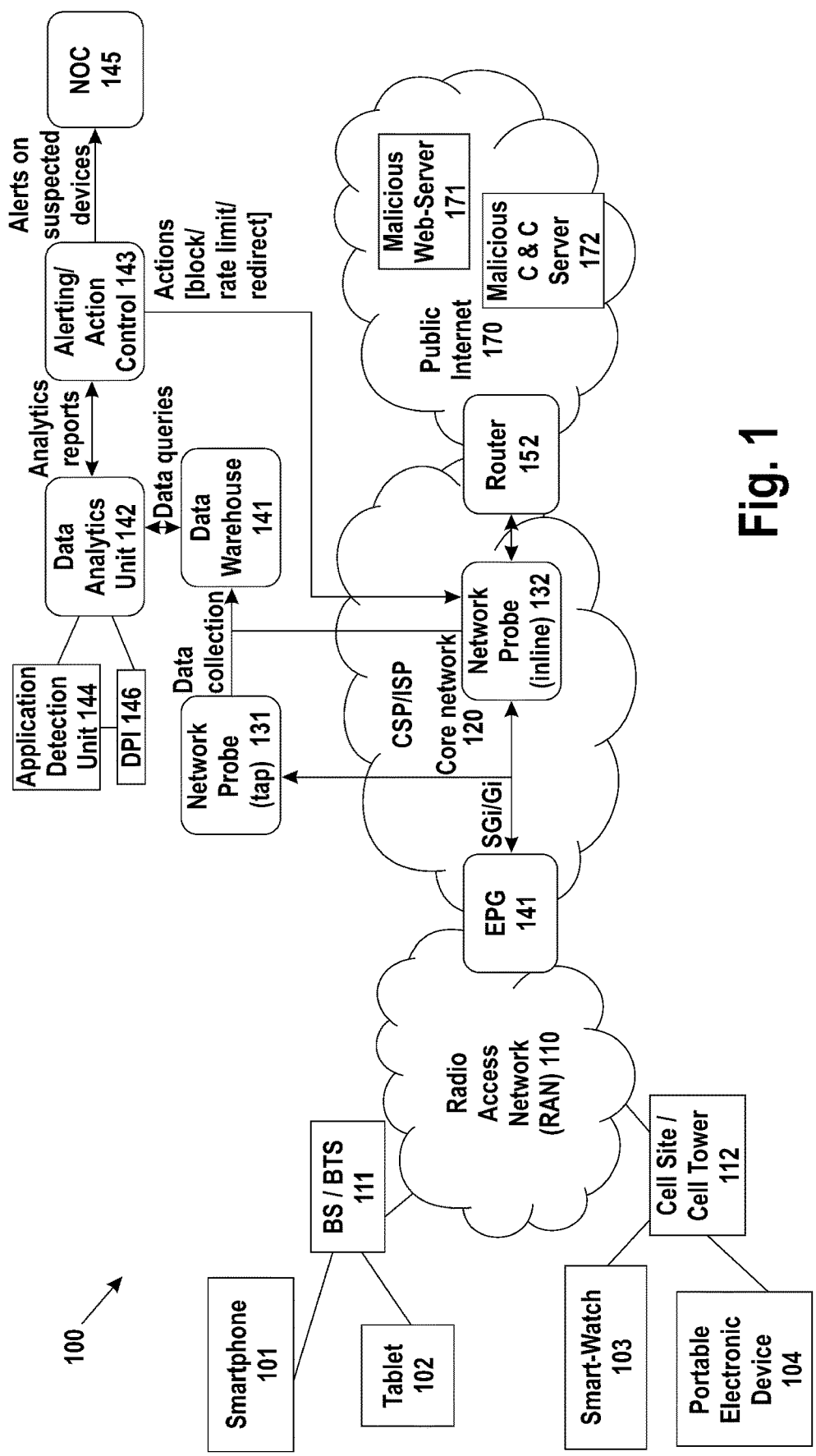
FIG. 1 is a schematic illustration of a system, in accordance with some demonstrative embodiments of the present invention.

The present invention comprises methods, devices and/or systems for detection of a "bot" or malware or virus or code or script or program or unauthorized module, which performs cryptocurrency mining operations and/or or cryptocurrency computing operations, on an electronic device and particularly on a portable electronic device such as a cellular phone, a smartphone, a tablet, a "phablet" device, a smartwatch, a gaming device, a laptop computer, or the like; and particularly when such module is unauthorized by and/or is unknown to the legitimate (or legal) user or owner or administrator of such device, or the administrator or owner of a network or a system (e.g., an enterprise network or system, an organization network or system, a corporate network or system) that the electronic device is part of or that the electronic device is utilizing for communications.

The terms "cryptocurrency" or "crypto-currency" or "crypto currency" as used herein may include, for example, any suitable digital asset or virtual asset or digital item that is structured or designed to operate (or to be utilized) as a medium-of-exchange or as a virtual coin or as a virtual currency that can be transferred, sent, received, purchased, sold and/or exchanged (e.g., exchanged with or converted to other virtual assets or other types of crypto-currency, and/or exchanged with fiat currency or fiat money); and particularly (but not necessarily), such digital asset or virtual asset that utilizes cryptography (e.g., encryption operations, decryption operations, hashing operations, digital signature operations, and/or other cryptographic operations) for its creation and/or its transfer and/or its conveyance and/or for its exchange, and/or for authenticating one or more properties of such digital asset and/or virtual asset, and/or for authenticating or for performing a transaction (e.g., transfer, send, receive, sell, purchase) with regard to such digital asset or virtual asset; and particularly (but not necessarily), such digital asset or virtual asset whose existence and/or ownership and/or amount and/or transaction-history and/or other characteristics thereof are stored in a "blockchain" database or data-set or public transaction database which functions as a centralized ledger or as a distributed ledger; and including, but not limited to, various types of such virtual currencies, digital currencies, alternative currencies or alternative coins or "alt-coins" or "altcoins", or cryptographic electronic money, or decentralized currencies, or blockchain-based virtual currencies, or assets known as (for example) Bitcoin, Bitcoind Cash, Etherium, Litecoin, Ripple, or the like.

The terms "cryptocurrency mining operations" or "crypto-currency mining operations" as used herein may include, for example, any cryptographic operations and/or processing operations that are directly or indirectly related to the creation of a new crypto-currency asset, or to the validating or authenticating of a crypto-currency transaction, or for participating in a pool or a group of participants that operates in parallel to solve a cryptographic challenge or a cryptographic puzzle in order to modify one or more content items of a cryptocurrency blockchain (e.g., in order to Confirm a cryptocurrency transaction that was submitted to a cryptocurrency system or network). It is clarified that such "mining" operations are not necessarily limited to the creation of a new crypto-coin; but rather, such "crypto-currency mining operations" may also include the performing of cryptographic operations whose purpose is not to generate a new crypto-coin but to validate or authenticate or confirm a transaction that was submitted to the network with regard to an already-existing crypto-coin.

The present invention may enable detection of a compromised electronic device that operates as a "bot" of a larger "bot-net" (network of such "bots"), and that performs cryptocurrency mining operations in its capacity as such "bot".

The Applicants have realized that hackers and attackers are using botnets or bot-nets or bot-networks or distributed network of bots, in order to mine cryptocurrency and/or in order to perform cryptocurrency mining operations. Accordingly, the present invention may utilize a detection of cryptocurrency mining as a way to detect bot-nets and/or bot-net participants and/or bot-net controllers.

The present invention may enable detection of web-servers or remote servers or other network entities or network elements, which injects or add a cryptocurrency mining script (or program code, or malware code) in to a content that is served to an end-user device, such as a web-page or HTML code or to a non-cryptocurrency-related JavaScript code. For example, the Applicants have realized that a web-server may be used to inject or to add cryptocurrency mining code into web-pages or content that is served to web-browsers and/or that is parsed or executed by web-browsers. Accordingly, the present invention may monitor electronic devices which perform or which start to perform cryptocurrency mining operations; may correlate the monitored data with browsing history of each such device; and may trace or track the network traffic (e.g., data outgoing upstream from the electronic device, and/or data incoming downstream to the electronic device) to detect and to pin-point a particular web-server that is responsible to the code injection.

The Applicants have realized that some conventional systems, at most, attempt to detect cryptocurrency mining operations in a manner similar to the way in which an anti-virus program operates; and, at most, a detected cryptocurrency mining malware is then handled in a manner similar to the way that a computer virus is handled, e.g., by deletion or by placing in a quarantine. However, the Applicants have realized that conventional systems fail to perform additional operations which may be useful upon such detection, for example, detecting or pin-pointing a malicious web-server that injects the cryptocurrency mining code into served content or served web-pages, or detecting or pin-pointing a remote node or device that controls the distributed bot-net of compromised devices (e.g., a bot-net controlling entity), or detecting and defining other properties of such distributed bot-net (e.g., size, number of participants, identity of participants, the role allocated to each participant, or the like).

The Applicants have realized that crypto-currency is a relatively new technology that has evolved in the recent years and is getting more and more attention; particularly with some cryptocurrencies increased their value significantly over a short period of time, thereby making them an attractive investment for some people, even though it may be a speculative investment for others. Generating a cryptocurrency asset, or operating or transacting on a cryptocurrency asset, may involves a process of "cryptocurrency mining" which executes an intensive algorithm on computing nodes; and which may require strong compute nodes, as well as investment in expansive hardware (e.g., dedicated mining ASIC units), and may consumes a lot of energy. Cryptocurrency mining can also run on a consumer computer or electronic device, such as a desktop computer, a laptop computer, a smartphone, a tablet, and other suitable devices that are able to execute code.

The Applicants have realized that malicious parties may create malware modules or undesired modules (from the point-of-view of the end-user), that exploit the computing power of a large number of Internet-connected devices in order to create a distributed "bot network" (botnet or bot-net) for cryptocurrency mining operations. Various ways may be used to infect the end-user device with the crypto-currency malware module that makes it become part of (or participant in) the botnet. For example, an attacker may perform active scanning and/or probing of a network and/or of Internet-connected devices, may identify a vulnerability of an end-user device (e.g., software vulnerability, a vulnerability in a particular program or application, an Operating System vulnerability, a firmware/BIOS vulnerability, or the like), and may utilize such vulnerability to plant the malicious cryptocurrency mining module in the compromised end-user device. Additionally or alternatively, various "phishing" techniques may be used by attackers for this purpose, such as, inducing the end-user to open an attached file sent to him via email, or inducing the end-user to access a particular remote resource (e.g., website) that is further used for the infection. Additionally or alternatively other attack techniques are available to attackers, for example, physical transfer of the malicious program via a USB Flash Drive, or the like.

The Applicants have further realized that there may exist a particular way for maliciously turning an end-user device of a non-attacker into a cryptocurrency mining "bot", without the end-user device knowing about it; particularly by using a web-server which stores the (malicious) cryptocurrency mining code which is then injected to a web-browser of an end-user device (e.g., without any evidence to the end-user). The injected malicious code sets up and performs the cryptocurrency mining activity, typically through or within the web-browser on the end-user device, and by utilizing the processing power and the energy consumption of the end-user device for the benefit of a remote attacker; whereas, in some cases the cryptocurrency mining operations may continue to be executed on the end-user device even after the user closes the web-browser application. In some cases, the infected malware code is further controlled by a remote "command and control" (C&C) entity or device, which manages remotely the distributed cryptocurrency mining activity performed by such infected end-user devices or "bots".

The present invention provides systems and methods to detect compromised devices that are infected by cryptocurrency mining malware, and particularly to detect and/or pin-point the malicious website/web-server that caused the infection and the malicious C&C entities; these detections are based on inspecting and analyzing the network traffic which is transported through or over or via a mobile communication network or a cellular communication network or other mobile Internet Service Provider (ISP) network.

The system of the present invention may utilize an intelligent network probe module, located inline within the mobile ISP network or in (or connected to) a "tap" or a network node that is capable of providing application(s) visibility, and optionally utilizing "big data" analytics or other analysis of monitored data in order to reach the above-mentioned detection decisions.

Reference is made to FIG. 1, which is a schematic illustration of a system 100, in accordance with some demonstrative embodiments of the present invention. In system 100 there may be various types of end-user devices; for instance, as non-limiting examples, there are shown a smartphone 101, a tablet 102, a smart-watch 103, and other type of portable electronic device 104. The end-user-devices 101-104 may communicate wirelessly with a Radio Access Network (RAN) 110, for example, via the cellular transceivers of the end-user devices which communicate with nearby infrastructure, for example, a nearby Base Station (BS) or Base Transceiver Station (BTS) 111, or a cell site or a cell tower 112, a Node B or an eNodeB, or other suitable infrastructure element of (or operably associated with) the RAN 110.

It is noted that for demonstrative purposes, system 100 is described as being (or as comprising) a cellular communication network; however, some embodiments of the present invention may comprise system(s) that utilize or that include non-cellular network(s) and/or other types of wireless communication network(s); as well as any suitable combination of wired network(s), wireless network(s), cellular network(s), and/or non-cellular network(s).

The RAN 110 is operably associated with or connected to a Cellular Service Provider (CSP)/Internet Service Provider (ISP) Core Network 120, which in turn is connected to the public Internet 170. The system may include other suitable network elements, routers, switches, hubs, gateways, relay nodes, or the like, such as an Evolved Packet Gateway 141 (e.g., between the RAN 110 and the Core Network 120), one or more routers 152 (e.g., between the Core Network 120 and the public Internet 170), or the like.

A malicious web-server 171 may be accessible to end-user devices via the public Internet 170, and may inject or add or insert a malicious code or malicious script into one or more web-pages (or other content) served by the malicious web-server 171 to end-user devices, including for example to one or more of end-user devices 101-104. The malicious code may be a code that instructs the end-user device to perform cryptocurrency mining operations, within its web-browser or even externally to its web-browser; and further instructs the end-user device to communicate with a malicious C&C server 172 (e.g., which may be accessible to the end-user device via the Internet). For example, the malicious C&C server 172 may allocate cryptographic tasks to each infected/compromised end-user device; may instruct each end-user device with regard to a destination/a recipient to which the end-user device should send its cryptographic results or output, and/or may instruct each end-user device with regard other parameters or operations that are related to such cryptocurrency mining (e.g., at what time intervals to send out the processed data; in which format to send out the processed output; and so forth).

In accordance with the present invention, one or more Network Probe units or modules are deployed at one or more suitable locations. For example, an inline network probe 132 may be deployed within the Core Network 120, at a suitable network location, e.g., between the EPG 141 and the router 152; or, after the entry-node from the RAN 110 and before the exit-node to the public Internet 170. Additionally or alternatively, an external network probe or a "tap" network probe 131 may be deployed in a manner which allows such probe to monitor or to listen to the packets that are transported within the Core Network 120, for example, monitoring a "tap" location along the SGi/Gi interface.

Data collected by the network probe(s) 131 and/or 132, is transferred to and/or is stored in a data warehouse 141 or other suitable repository or database. A data analytics unit 142 performs analysis operation, correlation operations, matching operations, and runs queries on the collected data, and generates and sends analytics reports or analysis results to an Alerting/Action Control Unit 143; which, in turn, sends alerts or notifications to a Network Operations Center (NOC) 145, and/or selectively performs one or more corrective actions in response to the analyzed data. In some embodiments, the data analysis operations may be implemented using one or more sub-units; for example, a correlator module, a matching module, a device grouping module, a sufficient similarity detector module, a pattern detector module, a comparator module, or the like; and/or, may utilize one or more pre-defined threshold values and/or lookup tables and/or ranges of values; for example, in order to correlate or match between (or, to identify or detect) pairs or groups of communication items that have one or more common properties; for example, in order to detect that multiple different devices, optionally belonging to the same device-type (e.g., smartphones; or, Android smartphones), have accessed a first particular website (the infecting web-server) and then after 14 to 17 minutes have also accessed a second particular website (the C&C server) and continued to access that second particular website at a certain time interval (e.g., once per hour; or, at a time interval that is generally fixed for each device but that varies between device to device). Other correlation or matching or grouping operations may be performed.

Such corrective actions may comprise, for example: blocking all the upstream communications outgoing from a compromised end-user device; blocking all the downstream communications incoming towards or directed to the compromised end-user device; blocking all communications that originate from, or that are directed to, the compromised end-user device; selectively blocking only a particular type of network traffic out of the upstream and/or the downstream network traffic of that compromised device (e.g., blocking communications that are directed from the compromised end-user device towards the malicious web-server 171 and/or the malicious C&C server 172; and/or blocking communications that are directed towards the compromised end-user device from the malicious web-server 171 and/or from the malicious C&C server 172; while allowing passage or allowing transport of packets that are directed to, or originate from, other servers or other destinations or other recipients other than the malicious web-server 171 and/or the malicious C&C server 172); performing one or more rate-limiting operations or bandwidth-limiting operations or throughput-limiting operations with regard to the compromised end-user device, e.g., up to a pre-defined rate limit in Mbps or otherwise); performing traffic redirection with regard to network traffic that is intended to be directed from the compromised end-user device towards the malicious web-server 171 and/or the malicious C&C server 172, or with regard to network traffic that is intended to be directed to the compromised end-user device from the malicious web-server 171 and/or the malicious C&C server 172); discarding or deleting, or avoiding to further transport or to further relay, packets that are directed from the compromised end-user device towards the malicious web-server 171 and/or the malicious C&C server 172; discarding or deleting, or avoiding to further transport or to further relay, packets that are directed towards the compromised end-user device from the malicious web-server 171 and/or the malicious C&C server 172; and/or performing other suitable corrective actions, remedial actions, data filtering operations, damage reduction operations, network quarantining operations, partial or full device isolation operations, or the like.

The system may detect that a particular end-user device is operating as a "bot" of a crypto-currency mining bot-net. For example, the data collection through the network probe(s) 131 and/or 132 may comprise monitoring of the network traffic, and extracting from it activity records per each such end-user device. The data warehouse 141 may thus store information describing the characteristics of the activity of each end-user device over a recent time period (e.g., over the past 1 or 12 or 24 hours; or over the past 3 or 7 or 30 days; or the like). The activity data that may be extracted and stored, with regard to each such end-user device, may be for example: date and time of activity, including for example time-stamp and date-stamp of the commencement of each activity session and the ending of each activity session; activity type (e.g., including the name of the application associated with the network activity; a unique device identifier; device type descriptor(s) (e.g., maker descriptor, model descriptor); Internet Protocol (IP) address of the end-user device; IP address of each web-server and of any Internet-connected entity or Internet-hosted entity that the end-user device communicates with; size or volume of payload or data sent from the end-user device to any such Internet-connected or Internet-hosted entity, and size or volume of payload or data sent to the end-user device from any such Internet-connected or Internet-hosted entity; communication protocol(s) used between the end-user device and any such Internet-connected or Internet-hosted entity (e.g., HTTP, or HTTPS, or FTP, or the like); domain name(s) that correspond to the IP address of each server or entity that the end-user device communicates with; geo-location information of each server or entity that the end-user device communicates with (e.g., derived by geo-location of the IP address of each such entity; such as, an indicator that the entity is geo-located as residing in Russia or in China); and/or other suitable data.

Detection of a crypto-currency mining bot is triggered or is determined, upon detection of crypto-currency mining operation(s) or crypto-currency mining activity at an end-user device; for example, based on the analysis of the data collected or monitored by network probe(s) 131 and/or 132, and particularly utilizing an Application Detection Unit 144 which may be part of such network probe(s) or may be associated with such network probe(s) or may be part of the Data Analytics Unit 142 or may be associated with the Data Analytics Unit 142 (e.g., as depicted for demonstrative purposes in FIG. 1).

The Application Detection Unit 144 may utilize one or more sub-units or modules to perform detection or identification of the application or "app" or program that is associated with a packet or with a stream-of-packets or with a batch-of-packets or with a group of consecutive or non-consecutive packets that are sent from (or are directed to) a particular end-user device. For example, the Application Detection Unit 144 may comprise or may utilize, for this purpose: a Deep Packet Inspection (DPI) unit 146, able to perform DPI operations and advanced packet analysis, processing or taking into account the payload of packets being transported; analyzing the Internet Protocol (IP) header of packets, as well as secondary header(s) of packets such as Transmission Control Protocol (TCP) header or User Datagram Protocol (UDP) header), performing shallow packet inspection, performing stateful packet inspection, or the like.

For example, once an end-user device begins cryptocurrency mining operations, it performs one or more particular communication(s) through the Internet with (towards, from) the entity that controls the cryptocurrency mining bot-net. This activity is detected by the network probe(s). Furthermore, analyzing the network activity of this particular end-user device, and particularly from this time-point and backwards in time (e.g., within a particular time-window, such as 12 hours or 1 day or 7 days or 30 days), may enable the system to determine or to confirm whether this is indeed the first-ever cryptocurrency mining activity of that particular end-user device.

In some embodiments, for example, trigger(s) for detection of cryptocurrency mining bot activity may be detection of one or more of: (i) a specific end-user device (e.g., smartphone, tablet, or the like) started performing communications on the network that are identified as being related to, or being part of, cryptocurrency mining operations; (ii) a specific end-user device receives a communication over the network, which is identified or detected as a communication message that allocates to that end-user device a cryptographic task (or cryptographic challenge, or cryptographic operation) that is allocated for processing by that end-user device; (iii) a specific end-user device sends a communication over the network, which is identified or detected as a communication message in which the end-user device reports a cryptographic solution or a cryptographic result or a cryptographic outcome, to an allocated cryptographic challenge or task; (iv) detection of an abnormal increase in the overall cryptocurrency mining activity across the network or across a group of end-user devices (e.g., a group of 500 smartphones; a group of 400 tablets; a group of mobile devices of an organization or enterprise), for example, the average (or the peak maximum) of cryptocurrency mining activity in the past 7 days was 5 unique smartphone devices, whereas the average (or the peak maximum) of cryptocurrency mining activity in the past 12 hours was 185 unique smartphones, thereby indicating that a large groups of smartphones were infected or compromised and were turned into cryptocurrency mining bots of a cryptocurrency mining bot-net.

In some embodiments, "big data" analysis techniques and/or other data analysis methods may be used to find or to detect common network activity for the group of smartphones that started generating new cryptocurrency mining activity (e.g., as mentioned above). For example, such data analysis may inspect the recent network activity and/or the recent communication(s) of that group of smartphones, starting from the earliest point in time where the cryptocurrency mining activity was detected; and such inspection may allow the system to find or to pin-point, for example: (a) a particular website or domain or sub-domain or web-server or IP address or Internet-connected entity that distributed the malware causing the malicious cryptocurrency mining; (b) a particular server or web-server or IP-connected entity that is estimated to be the C&C Server which controls the cryptocurrency mining bots, allocates to them cryptographic tasks, and receives or collects from them cryptographic outcomes or solutions or responses; (c) a Hosting Service that is estimated to be hosting the malicious web-server and/or the malicious C&C server (e.g., based on WHOIS records; based on a trace-route; based on IP-address geo-location; based on one or more content-items which some web-hosting service providers may add to served content and/or to served packets; or the like).

The above detection and pin-pointing may be performed, for example, by finding the most popular websites and/or web-pages and/or web-servers and/or IP addresses, that are accessed by that group of smartphones; namely, by finding which particular IP address or web-server or website or web-page is (or are) were accessed by all or by most of those smartphones (or end-user devices), and/or by inspecting or finding these websites or web-pages or IP addresses these that were accessed by most of the smartphone in that group and/or by taking into account also the chronology of these accesses by each smartphone in the group.

For example, there are 100 smartphones that were detected as starting cryptocurrency mining activity in the past 24 hours; and 98 out of those 100 smartphones have accessed "Facebook.com/particular-page"; and then all those 98 smartphones have accessed a particular IP address or destination (e.g., particularly an unknown IP address; or an IP address that does not resolve into a domain name; or the like); and then, within a time-window of 30 to 50 minutes after accessing that particular IP address, each one of those 98 smartphones started to exhibit cryptocurrency mining network activity; and the above insights enable the system to determine that this particular Facebook page was the source of the malware, and further enable the system to pin-point the suspected C&C Server (e.g., associated with that common IP address that all those 98 smartphones have accessed 30 to 50 minutes prior to commencing cryptocurrency mining operations that are reflected in cryptocurrency mining network activity).

Upon such detection(s), the system may perform one or more corrective actions or remedial actions, for example: (i) generate an alert or a notification and send it to the end-user device that is estimated to be compromised or infected as a cryptocurrency mining bot, such as, a text/SMS message, an email message, a cellular communication network message (e.g., similar to a "free" message that the CSP sometimes sends to cellular subscribers with regard to account information or billing or service malfunction); (ii) generate and send a similar alert or notification to another device or to another recipient, for example, to an email address that is known to be associated with that end-user device, or to a system administration of an organization or enterprise that is known to be the owner of that particular end-user device (e.g., based on subscriber information or billing information that may be available to the CSP); (iii) pro-actively and/or selectively and/or entirely block or filter or discard or not-relay, all or some of communications and/or messages and/or packets that are directed to the suspected C&C Server or that are sent from the suspected C&C server; (iv) send a notification or alert to the CSP and/or ISP and/or hosting service that are associated with the malicious website; (v) send a notification or alert to the CSP and/or ISP and/or hosting service that are associated with the malicious C&C server; (vi) perform rate-limiting or bandwidth-limiting of communications to or from the malicious C&C server, or perform rate-limiting or bandwidth-limiting of communications to or from the malicious website; (vii) perform rate-limiting of communications to or from the compromised or infected end-user device (e.g., at least on a temporary basis, while inviting the end-user of such device to rectify the problem).

In some embodiments, for example, detection of cryptocurrency mining activity may be detected by the network probe(s) by finding a sequence of communications between the end-user device (the cryptocurrency miner) and the mining pool server (the C&C server). For example, there are various cryptocurrency mining protocols which can be obtained by the system, such as the Stratum protocol, which can be used for detecting miner-server communication flow(s).

For example, end-user device (cryptocurrency mining bot; cryptocurrency miner) sends to the C&C server (cryptocurrency mining manager/allocator, which manages a distributed cryptocurrency mining pool), a request for connection the cryptocurrency mining pool server; such as, {"id": 1, "method": "mining.subscribe", "params": [ ]}\n.

In response, the C&C server responds to the end-user device with: {"id": 1, "result": [[["mining.set_difficulty", "b4b8 . . . d6497cac52]", ["mining.notify", "ae6812 . . . dd95cf71f"]], "08000002", 4], "error": null}\n.

Then, the end-user device sends to the C&C server a request for authorization to perform cryptocurrency mining work: {"params": ["slush.miner1", "password"], "id": 2, "method": "mining.authorize"}\n.

Then, the C&C server responds to the end-user device with authorization to perform cryptocurrency mining operations: {"error": null, "id": 2, "result": true}\n.

Then, the C&C server further sends to the end-user device a notification of which cryptocurrency mining job(s) are allocated to be performed by that end-user device; for example: {"params": ["bf", "4d16b6 . . . f85af6e00000000", "0100082f0 . . . 4b8864e5008", "072f7 . . . 48ed98811111", [ ], "00000002", "1c2ac4af", "504e86b9", false], "id": null, "method": "mining.notify"}.

Later, the end-user device (the cryptocurrency miner bot) sends to the C&C server the submitted shares (e.g., the outcome or results of the cryptographic operations that were performed by the compromised or infected end-user device as its part in the distributed cryptocurrency mining operations); for example: {"params": ["slush.miner1", "bf", "00000001", "504e86ed", "b2957c02"], "id": 4, "method": "mining.submit"}\n.

In response, the C&C server responds to that submission from the end-user device with a response message, for example: {"error": null, "id": 2, "result": true}\n.

The above is only a demonstrative non-limiting example, which utilizes the Stratum protocol for distributed cryptocurrency mining. Messages are exchanged and delivered over HTTP, and typically include at least multiple types of communications, for example: (i) Request from client (miner bot) to server (mining pool C&C server); (ii) Response from server (mining pool C&C server) to client (miner bot); (iii) Notification from server (mining pool C&C server) to client (miner bot). Each of these communication has or includes or utilizes different methods or functions. Typically, each message is structured in accordance with a pre-defined structure, which includes: (i) Unique ID which is incremented for each communication between the miner and the server; (ii) Method (function) type; (iii) Parameters that are needed for each Method; the set of parameters are changed per method type. Optionally, server responses include an error code to indicate whether the transaction succeeded or failed, and/or to indicate errors or problems.

Figure 2:
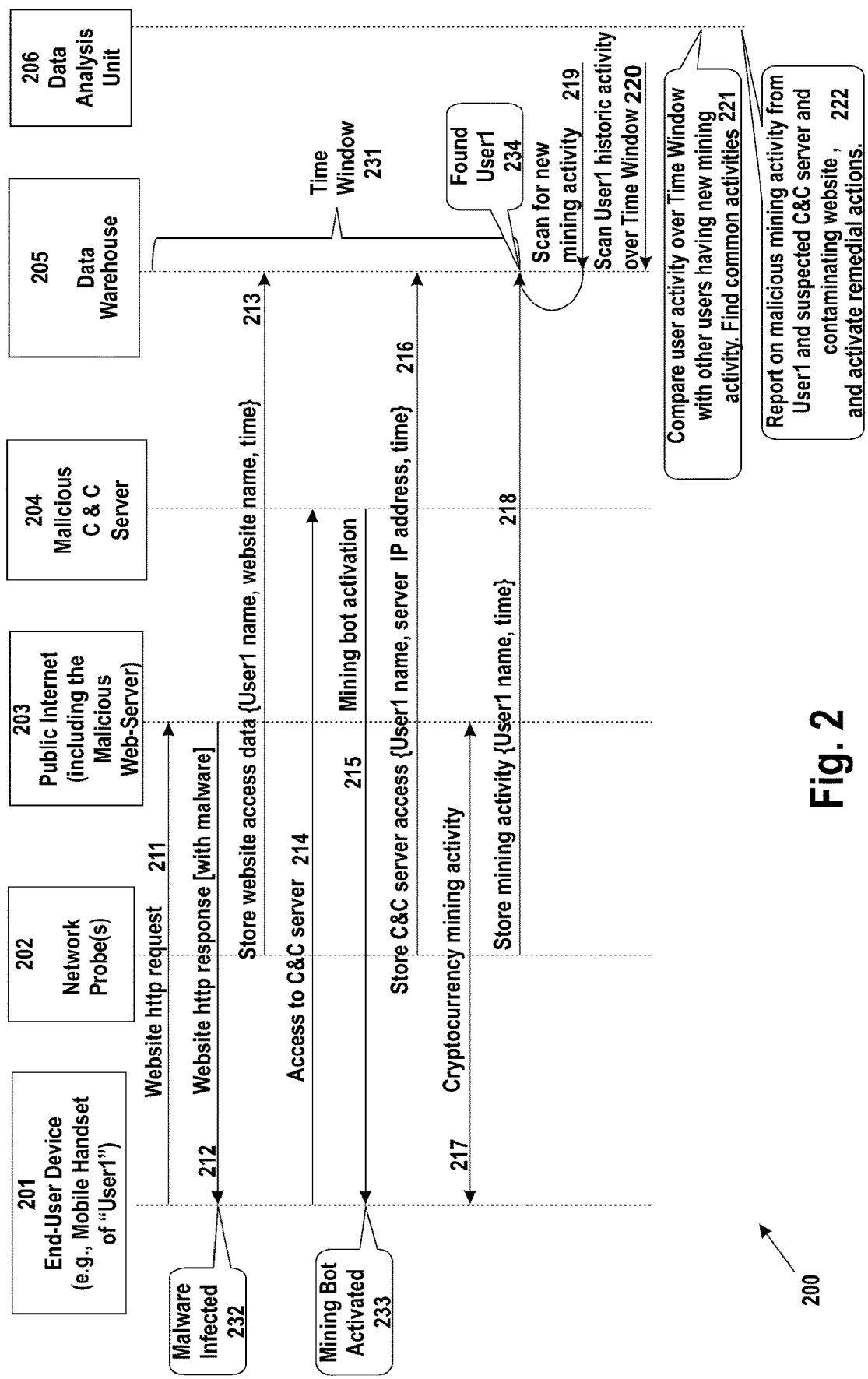
FIG. 2 is a diagram demonstrating a flow of operations and events, in accordance with some demonstrative embodiments of the present invention.

Reference is made to FIG. 2, which is a diagram 200 demonstrating a flow of operations and events, in accordance with some demonstrative embodiments of the present invention. The operations may be performed, for example, by (or in) a system which comprises multiple units or entities, for example: an end-user device 201 such as a mobile handset (e.g., a smartphone owned or utilized by "User1"); one or more network probe(s) 201, such as an inline (or in-network) detection unit (e.g., implemented as a network equipment within a communications network), an/or a network listening unit that listens to network traffic via a "tap" from such network; infrastructure (e.g., wires, links, servers, repositories, hosting platforms, or the like) of the public Internet 203, which particularly includes a malicious web-server that infects end-users with a cryptocurrency mining malware; a malicious C&C server 204 which remotely controls or manages the cryptocurrency mining operations of a distributed bot-net of infected/compromised bots (end-user devices, such as device 201 once it is infected); a Data Warehouse 205 or other "big data" repository, to store data representing network activity of (e.g., to and from) each end-user device; a "big data" analytics module or a similar Data Analysis Unit 206 or analyzer module, to analyze the collected data and to generate from it one or more insights, such as, detecting an infected/compromised end-user device that became a cryptocurrency mining bot, detecting multiple participants of the same distributed bot-net, detecting a malicious C&C server that controls those bot-net participants (e.g., allocates to them cryptographic tasks; receives from them cryptographic outputs), detecting a malicious web-server that infects end-user devices with cryptocurrency mining malware (e.g., typically served to the end-user device as augmented or injected or added content or script or program, via or within a web-browser running on the end-user device). Other units or entity may perform additional operations; for example, an enforcement/quarantining module may perform or may enforce rate-limiting or bandwidth limiting with regard to an infected end-user device and/or C&C server and/or infecting web-server; or may perform selective (or entire) filtering or blocking or discarding of packets that are transported to and/or from such infected end-user device, and/or C&C server and/or infecting web-server; and/or may generate and send notifications or alerts to relevant recipients (e.g., a user or owner of the end-user device, or an organization or enterprise that owns it directly or indirectly or that is billed for its utilization; a web hosting service; a Content Deliver Network (CDN) or an operator thereof; a CSP or an ISP).

As demonstrated, the end-user device 201 of User1, is accessing a web-site through the public Internet; and particularly, it accesses a website that is hosted or served by the malicious web-server. For example, the end-user device 201 of User 1 sends a website HTTP request (step 211); and the malicious web-server sends back to the mobile handset 201 a website HTTP response with the cryptocurrency mining malware module (step 212). As indicated (even 232), at this point the end-user device 201 of User1 becomes infected with the cryptocurrency mining malware module.

The network probe(s) 202 monitor and listen to network traffic; and store website access data (step 213) in the data warehouse 205, for example, storing that the end-user device 201 has accessed the particular web-server (which is going to be identified subsequently as a malicious web-server), storing an identifier of end-user device 201, storing an identifier of User1, storing the name and/or IP address of the accessed web-site(s) and/or web-server, storing time-stamp and date-stamp of each access (e.g., each HTTP request, each HTTP response), or the like.

Then, the infected end-user device 201 is accessing the malicious C&C server 204 (step 214); for example, sending to it an initial subscription message in which the infected end-user device 201 subscribes to join a distributed pool of cryptocurrency mining bots. In response, the malicious C&C server 204 sends back (step 215) to the infected end-user device 201 a message indicating that the subscription is confirmed and that end-user device 201 is now an activated cryptocurrency mining bot. As indicated (event 233), at that point, the infected end-user device 201 becomes an activated cryptocurrency mining bot 233, associated with the malicious C&C server 204 and/or being a participant in a distributed cryptocurrency mining bot-net that is managed by the malicious C&C server 204.

The network probe(s) 202 monitor and listen to network traffic; and store in the Data Warehouse 205 the website access data (step 216) with regard to said initial access of the end-user device 201 to the malicious C&C server 204 (or, to the particular server that is going to be identified later as a malicious C&C server); for example, storing that the end-user device 201 has accessed the particular C&C server (or, the server that is going to be identified subsequently as a malicious C&C server), storing an identifier of end-user device 201, storing an identifier of User1, storing the name and/or IP address of the accessed web-site(s) and/or web-server, storing time-stamp and date-stamp of each access (e.g., each HTTP request, each HTTP response), or the like.

Subsequently, communications are exchanged periodically (step 217) between the infected end-user device 201 and the malicious C&C server 204 that controls it; for example, the malicious C&C server 204 sends to the infected end-user device 201 data representing a cryptographic challenge (or a portion thereof) that needs to be processed or solved or computed by the infected end-user device; later, the infected end-user device 201 sends to the malicious C&C server 204 a response (e.g., a cryptographic or computed solution, a cryptographic or computed outcome) to the allocated challenge or task; or other cryptocurrency mining related communications may be exchanged (e.g., a message from the malicious C&C server to the infected end-user device 201 to stop or to abort the processing of a previously-allocated cryptographic tasks, since it became obsolete or un-needed; and/or allocation of a replacement task or an updated task for cryptographic processing or for computing at the infected end-user device 201).

The network probe(s) 202 monitor and listen to network traffic; and store (step 218) data representing these network activity, with regard to such cryptocurrency mining related communications between the end-user device 201 and the malicious C&C server 204 (or, to the particular server that is going to be identified later as a malicious C&C server); for example, storing that the end-user device 201 has accessed the particular C&C server (or, the server that is going to be identified subsequently as a malicious C&C server), storing an identifier of end-user device 201, storing an identifier of User1, storing the name and/or IP address of the accessed web-site(s) and/or web-server, storing time-stamp and date-stamp of each access (e.g., each HTTP request, each HTTP response), or the like.

The data analysis unit 206 performs analysis of the data stored in the data warehouse 205, and particularly the data which represents the network activity of end-user device 201 in relation to the (malicious) web-server and the (malicious) C&C server 204, and particularly data related to time-window 231; and determines (event 234), based on analysis of these communications, their format, their structure, their payload, their headers, their content, their timing, their size or volume, their frequency, their IP addresses, and/or other characteristics related to them, that the end-user device 201 is estimated (or determined) to be an infected end-user device that is actively performing cryptocurrency mining as an infected bot, and/or that the particular web-server that was accessed by the end-user device in steps 211/212 is a malicious web-server that infects end-user devices with a cryptocurrency mining malware, and/or that the particular server that was accessed by the end-user devices in steps 214/215/217 is a malicious C&C server that controls the cryptocurrency mining activity of end-user device 201.

The data analysis unit 206 continues to scan and analyze the collected data of network activity (step 219) in order to detect further or new or fresh or additional cryptocurrency mining activity of that particular end-user device 201. The data analysis unit 206 also scans and analyzes (step 220) the past or historic network activity data of end-user device 201 during the past time-window 231, in order to determine (or, in order to increase the certainty of a previous estimation) that the end-user device 201 is indeed an infected and activated and operational cryptocurrency mining bot.

The data analysis unit 206 may further analyze the collected data, with regard to that particular end-user device 201 as well as relative to other end-user devices or other users (step 221), and may compare the user activity/the device activity of end-user device 201 over the time-window 231 (and/or over other time-windows) relative to the activity of other users/other devices and particularly of devices that are estimated to be exhibiting network activity that indicates cryptocurrency mining by such devices; and the data analysis unit 206 may detect one or more common characteristics in such cross-device communications or network activity, or may detect one or more common activities or types of communications, which may enable the data analysis unit, for example, (a) to determine, or to re-confirm a previous determination or estimation, that end-user device 201 is indeed an infected and activated and operational cryptocurrency mining bot; and/or (b) to determine that another end-user device, of another user, is similarly an infected end-user device and/or an infected-and-activated cryptocurrency mining bot and/or an infected-and-activated-and-operational cryptocurrency mining bot; and/or (c) to determine that two or more particular end-user devices are participants in the same distributed bot-net of cryptocurrency mining bots that are remotely controlled by the same malicious C&C server; and/or (d) to determine, or to re-confirm a previous determination or estimation, that a particular server is a malicious C&C server that controls a distributed cryptocurrency mining bot-net; (e) to determine, or to re-confirm a previous determination or estimation, that a particular web-server is a malicious web-sever that infects end-user devise with a cryptocurrency mining malware. These detections or determinations may then enable the system to generate and send notifications or alerts or reports (step 222) with regard to the end-user device(s) that are determined to be infected/activated/operational cryptocurrency mining bots, as well as with regard to the identity of the malicious (infecting) web-server and the malicious (controlling) C&C server 204; and to activate or deploy or enforce remedial actions or corrective actions or damage-reducing actions, for example, by selectively or entirely filtering or blocking or quarantining or discarding network traffic from or to the end-user device 201 and/or from or to the malicious infecting web-server and/or the malicious C&C server 204.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a method comprises: monitoring communication network activity of an end-user device that communicates with one or more servers over a communication network; analyzing packets of data that are transported via said communication network; and based on said analyzing, performing at least one of: (I) determining that said a particular server is a malicious infecting web-server that infects multiple accessing devices with a cryptocurrency mining malware; and/or (II) determining that a specific server is a malicious Command and Control (C&C) server that commands and controls a distributed bot-net of cryptocurrency mining bots.

In some embodiments, the analyzing comprises: (a) analyzing network communications from and to said end-user device, and determining that said end-user device began at a particular time-point to engage in cryptocurrency mining activity; (b) performing backward analysis of prior network communications from and to said end-user device, that occurred prior to said particular time-point of beginning said cryptocurrency mining activity at said end-user device; and correlating between (I) said prior network communications from and to said end-user device, and (ii) other network communications exchanged between other end-user devices and a remote server.

In some embodiments, the analyzing comprises: (a) analyzing network communications from and to a first end-user device, and determining that said first end-user device began at a first particular time-point to engage in cryptocurrency mining activity; (b) analyzing network communications from and to a second end-user device, and determining that said second end-user device began at a second particular time-point to engage in cryptocurrency mining activity; (c) correlating between (I) prior network communications that involved said first end-user device prior to said first particular time-point, and (II) prior network communications that involved said second end-user device prior to said particular time-point; and based on said correlating, determining that said particular server is the malicious infecting web-server that infects multiple accessing devices with a cryptocurrency mining malware.

In some embodiments, the analyzing comprises: (a) analyzing network communications from and to a first end-user device, and determining that said first end-user device began at a first particular time-point to engage in cryptocurrency mining activity; (b) analyzing network communications from and to a second end-user device, and determining that said second end-user device began at a second particular time-point to engage in cryptocurrency mining activity; (c) correlating between (I) prior network communications that involved said first end-user device prior to said first particular time-point, and (II) prior network communications that involved said second end-user device prior to said particular time-point; and based on said correlating, determining that said specific server is the malicious Command and Control (C&C) server that commands and controls a distributed bot-net of cryptocurrency mining bots.

In some embodiments, the analyzing comprises: correlating among network communications of multiple end-user devices, that have been identified as engaging in cryptocurrency mining activity, to identify a particular remote entity which is the malicious infecting web-server that infects multiple accessing devices with a cryptocurrency mining malware.

In some embodiments, the analyzing comprises: correlating among network communications of multiple end-user devices, that have been identified as engaging in cryptocurrency mining activity, to identify a particular remote entity which is the malicious Command and Control (C&C) server that commands and controls a distributed bot-net of cryptocurrency mining bots.

In some embodiments, the analyzing comprises: detecting a first set of communications, between said end-user device and a first server, in which said first server infects said end-user device with a cryptocurrency mining malware; detecting a second set of communications, between said end-user device and a second server, in which said second server activates said end-user device as an activated cryptocurrency mining bot; detecting a third set of communications, between said end-user device and said second server, in which said second server allocates a cryptocurrency mining task to said end-user device and receives a cryptocurrency mining output from said end-user device.

In some embodiments, the method further comprises: selectively blocking some, but not all, of data packets that are sent from said end-user device via said communication network, based on determining that said end-user device is an infected and activated and operational cryptocurrency mining bot.

In some embodiments, the method further comprises: selectively blocking some, but not all, of data packets that are sent towards said end-user device via said cellular communication network, based on determining that said end-user device is an infected and activated and operational cryptocurrency mining bot.

In some embodiments, the method further comprises: sending an alert notification to a user of said end-user device, indicating that it was determined that said end-user device is an infected and activated and operational cryptocurrency mining bot.

In some embodiments, the method further comprises: sending a query notification to a user of said end-user device, querying whether said user is aware that said end-user device is performing cryptocurrency mining activity; upon receiving a positive response, authorizing further network communications from and to said end-user device; upon receiving a negative response, blocking at least some network communications to or from said end-user device.

In some embodiments, the method further comprises: (A) blocking transport of data packets that belong to one or more of the following groups: (i) data packets sent from said malicious infecting web-server to said end-user device; (ii) data packets sent to said malicious infecting web-server by said end-user device; (iii) data packets sent from said malicious C&C server to said end-user device; (iv) data packets sent to said malicious C&C server from said end-user device; (B) relaying and transporting data packets that are sent to said end-user device or that are sent from said end-user device, and that do not belong to any of the groups (i), (ii), (iii) or (iv).

In some embodiments, the method further comprises: performing a network quarantine of said malicious infecting web-server.

In some embodiments, the method further comprises: performing a network quarantine of said malicious C&C server.

In some embodiments, the method further comprises: performing a network rate-limiting with regard to data sent from said malicious infecting web-server.

In some embodiments, the method further comprises: performing a network rate-limiting with regard to data sent from said malicious C&C server.

In some embodiments, the method further comprises: performing a network rate-limiting with regard to data sent from said end-user device, based on determining that said end-user device is an infected and activated and operational cryptocurrency mining bot.

In some embodiments, the analyzing comprises: (a) detecting an access of said end-user device to a first server, (b) detecting that the access of step (a) was followed within a time period T1 by an access of said end-user device to a second server, (c) detecting that the access of step (b) was followed within a time period T2 by one or more subsequent accesses of said end-user device to said second server.

In some embodiments, the detecting of step (b) is performed by: (b1) detecting a cryptocurrency mining subscription request sent from said end-user device to said second server, wherein the cryptocurrency mining subscription request comprises a first data structure that corresponds to a subscription request of a cryptocurrency mining participant to join a cryptocurrency mining pool; (b2) subsequently, detecting a cryptocurrency mining subscription response sent to said end-user device from said second server, wherein the cryptocurrency mining subscription response comprises a second data structure that corresponds to a subscription response in which a cryptocurrency mining pool manager approves said subscription request.

In some embodiments, the detecting of step (c) is performed by: (c1) detecting a first message sent to said end-user device from said second server, wherein the first message comprises a first data structure that corresponds to an allocation of a cryptographic task for local processing at said end-user device; (c2) subsequently, detecting a second message sent from said end-user device to said second server, wherein the second message comprises a second data structure that corresponds to a cryptographic outcome of a processed cryptographic task.

In some embodiments, the method comprises: determining that said end-user device is associated with a device-type; analyzing network activity data of said end-user device, relative to network activity data of other end-user devices of same device-type; detecting that both (I) said end-user device, and (II) said other end-user devices, exhibit a same activity pattern of (i) accessing said first server, and then (ii) accessing said second server for cryptocurrency mining activation, and then (III) periodically communicate with said second server to exchange messages that allocate cryptographic tasks to end-user devices and that collect cryptographic outcomes from end-user devices; determining that a group of said other end-user devices, of the same device-type that is associated with said end-user device, is a group of infected and activated and operational cryptocurrency mining bots.

In some embodiments, the communication network is a cellular communication network; wherein the analyzing comprises analyzing of cellular data packets.

In some embodiments, the communication network is a cellular communication network; wherein the analyzing comprises analyzing of cellular data packets in TCP/IP format.

In some embodiments, the communication network is a cellular communication network; wherein the analyzing comprises analyzing of cellular data packets in Packet Data Protocol (PDP) format.

In some embodiments, the communication network is a cellular communication network; wherein the analyzing comprises analyzing of cellular data packets; wherein the method further comprises: (A) blocking transport of cellular data packets that belong to one or more of the following groups: (i) cellular data packets sent from said malicious infecting web-server to said end-user device; (ii) cellular data packets sent to said malicious infecting web-server by said end-user device; (iii) cellular data packets sent from said malicious C&C server to said end-user device; (iv) cellular data packets sent to said malicious C&C server from said end-user device; (B) relaying and transporting cellular data packets that are sent to said end-user device or that are sent from said end-user device, and that do not belong to any of the groups (i), (ii), (iii) or (iv).

In some embodiments, the communication network is a cellular communication network; wherein the analyzing comprises analyzing of cellular data packets; wherein the method further comprises: performing a cellular network quarantine of said malicious infecting web-server.

In some embodiments, the communication network is a cellular communication network; wherein the analyzing comprises analyzing of cellular data packets; wherein the method further comprises: performing a cellular network quarantine of said malicious C&C server.

In some embodiments, the communication network is a cellular communication network; wherein the analyzing comprises analyzing of cellular data packets; wherein the method further comprises: performing a cellular network rate-limiting with regard to data sent from said malicious infecting web-server.

In some embodiments, the communication network is a cellular communication network; wherein the analyzing comprises analyzing of cellular data packets; wherein the method further comprises: performing a cellular network rate-limiting with regard to data sent from said malicious C&C server.

In some embodiments, the communication network is a cellular communication network; wherein the analyzing comprises analyzing of cellular data packets; wherein the method further comprises: performing a cellular network rate-limiting with regard to data sent from said end-user device, based on determining that said end-user device is an infected and activated and operational cryptocurrency mining bot.

Some embodiments comprise a non-transitory storage medium having stored thereon instructions that, when executed by a machine, cause the machine to perform a method as described above.

Some embodiments include a system comprising: a network monitoring unit to monitor communication network activity of an end-user device that communicates with one or more servers over a communication network; a network activity analyzer to analyze packets of data that are transported via said communication network; and to perform at least one of: (I) to determine that said a particular server is a malicious infecting web-server that infects multiple accessing devices with a cryptocurrency mining malware; (II) to determine that a specific server is a malicious Command and Control (C&C) server that commands and controls a distributed bot-net of cryptocurrency mining bots.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
monitoring communication network activity of an end-user device that communicates with one or more servers over a communication network;
analyzing packets of data that are transported via said communication network;
and based on said analyzing, performing at least one of:
    (I) determining that a particular server is a malicious infecting web-server that infects multiple accessing devices with a cryptocurrency mining malware;
    (II) determining that a specific server is a malicious Command and Control (C&C) server that commands and controls a distributed bot-net of cryptocurrency mining bots;
wherein the analyzing comprises:
(a) analyzing network communications from and to said end-user device, and determining that said end-user device began at a particular time-point to engage in cryptocurrency mining activity;
(b) performing backward analysis of prior network communications from and to said end-user device, that occurred prior to said particular time-point of beginning said cryptocurrency mining activity at said end-user device; and correlating between (i) said prior network communications from and to said end-user device, and (ii) other network communications exchanged between other end-user devices and a remote server.

2. The method of claim 1,
wherein the analyzing comprises:
correlating among network communications of multiple end-user devices, that have been identified as engaging in cryptocurrency mining activity, to identify a particular remote entity which is the malicious infecting web-server that infects multiple accessing devices with a cryptocurrency mining malware.

3. The method of claim 1,
wherein the analyzing comprises:
correlating among network communications of multiple end-user devices, that have been identified as engaging in cryptocurrency mining activity, to identify a particular remote entity which is the malicious Command and Control (C&C) server that commands and controls a distributed bot-net of cryptocurrency mining bots.

4. The method of claim 1,
wherein the analyzing comprises:
detecting a first set of communications, between said end-user device and a first server, in which said first server infects said end-user device with a cryptocurrency mining malware;
detecting a second set of communications, between said end-user device and a second server, in which said second server activates said end-user device as an activated cryptocurrency mining bot;
detecting a third set of communications, between said end-user device and said second server, in which said second server allocates a cryptocurrency mining task to said end-user device and receives a cryptocurrency mining output from said end-user device.

5. The method of claim 1, further comprising:
selectively blocking some, but not all, of data packets that are sent from said end-user device via said communication network, based on determining that said end-user device is an infected and activated and operational cryptocurrency mining bot.

6. The method of claim 1, further comprising:
selectively blocking some, but not all, of data packets that are sent towards said end-user device via said cellular communication network, based on determining that said end-user device is an infected and activated and operational cryptocurrency mining bot.

7. The method of claim 1, further comprising:
sending an alert notification to a user of said end-user device, indicating that it was determined that said end-user device is an infected and activated and operational cryptocurrency mining bot.

8. The method of claim 1, further comprising:
sending a query notification to a user of said end-user device, querying whether said user is aware that said end-user device is performing cryptocurrency mining activity;
upon receiving a positive response, authorizing further network communications from and to said end-user device;
upon receiving a negative response, blocking at least some network communications to or from said end-user device.

9. The method of claim 1, further comprising:
(A) blocking transport of data packets that belong to one or more of the following groups:

(i) data packets sent from said malicious infecting web-server to said end-user device;

(ii) data packets sent to said malicious infecting web-server by said end-user device;

(iii) data packets sent from said malicious C&C server to said end-user device;

(iv) data packets sent to said malicious C&C server from said end-user device;

(B) relaying and transporting data packets that are sent to said end-user device or that are sent from said end-user device, and that do not belong to any of the groups (i), (ii), (iii) or (iv).

10. The method of claim 1, further comprising:
performing a network quarantine of said malicious infecting web-server.

11. The method of claim 1, further comprising:
performing a network quarantine of said malicious C&C server.

12. The method of claim 1, further comprising:
performing a network rate-limiting with regard to data sent from said malicious infecting web-server.

13. The method of claim 1, further comprising:
performing a network rate-limiting with regard to data sent from said malicious C&C server.

14. The method of claim 1, further comprising:
performing a network rate-limiting with regard to data sent from said end-user device, based on determining that said end-user device is an infected and activated and operational cryptocurrency mining bot.

15. The method of claim 1,
wherein the analyzing comprises
(a) detecting an access of said end-user device to a first server,
(b) detecting that the access of step (a) was followed within a time period T1 by an access of said end-user device to a second server,
(c) detecting that the access of step (b) was followed within a time period T2 by one or more subsequent accesses of said end-user device to said second server.

16. The method of claim 1, comprising:
determining that said end-user device is associated with a device-type;
analyzing network activity data of said end-user device, relative to network activity data of other end-user devices of same device-type;
detecting that both (I) said end-user device, and (II) said other end-user devices, exhibit a same activity pattern of (i) accessing said first server, and then (ii) accessing said second server for cryptocurrency mining activation, and then (III) periodically communicate with said second server to exchange messages that allocate cryptographic tasks to end-user devices and that collect cryptographic outcomes from end-user devices;
determining that a group of said other end-user devices, of the same device-type that is associated with said end-user device, is a group of infected and activated and operational cryptocurrency mining bots.

17. The method of claim 1,
wherein the communication network is a cellular communication network;
wherein the analyzing comprises analyzing of cellular data packets.

18. The method of claim 1,
wherein the communication network is a cellular communication network;
wherein the analyzing comprises analyzing of cellular data packets in Transmission Control Protocol/Internet Protocol (TCP/IP) format.

19. The method of claim 1,
wherein the communication network is a cellular communication network;
wherein the analyzing comprises analyzing of cellular data packets in Packet Data Protocol (PDP) format.

20. The method of claim 1,
wherein the communication network is a cellular communication network;
wherein the analyzing comprises analyzing of cellular data packets;
wherein the method further comprises:
(A) blocking transport of cellular data packets that belong to one or more of the following groups:
(i) cellular data packets sent from said malicious infecting web-server to said end-user device;
(ii) cellular data packets sent to said malicious infecting web-server by said end-user device;
(iii) cellular data packets sent from said malicious C&C server to said end-user device;
(iv) cellular data packets sent to said malicious C&C server from said end-user device;
(B) relaying and transporting cellular data packets that are sent to said end-user device or that are sent from said end-user device, and that do not belong to any of the groups (i), (ii), (iii) or (iv).

21. The method of claim 1,
wherein the communication network is a cellular communication network;
wherein the analyzing comprises analyzing of cellular data packets;
wherein the method further comprises:
performing a cellular network quarantine of said malicious infecting web-server.

22. The method of claim 1,
wherein the communication network is a cellular communication network;
wherein the analyzing comprises analyzing of cellular data packets;
wherein the method further comprises:
performing a cellular network quarantine of said malicious C&C server.

23. The method of claim 1,
wherein the communication network is a cellular communication network;
wherein the analyzing comprises analyzing of cellular data packets;
wherein the method further comprises:
performing a cellular network rate-limiting with regard to data sent from said malicious infecting web-server.

24. The method of claim 1,
wherein the communication network is a cellular communication network;
wherein the analyzing comprises analyzing of cellular data packets;
wherein the method further comprises:
performing a cellular network rate-limiting with regard to data sent from said malicious C&C server.

25. The method of claim 1,
wherein the communication network is a cellular communication network;
wherein the analyzing comprises analyzing of cellular data packets;

wherein the method further comprises:
performing a cellular network rate-limiting with regard to data sent from said end-user device, based on determining that said end-user device is an infected and activated and operational cryptocurrency mining bot.

26. A system comprising:
one or more processors, operably associated with one or more memory units storing instructions;
wherein the one or more processors are configured to execute the instructions:
to monitor communication network activity of an end-user device that communicates with one or more servers over a communication network;
to perform analysis of packets of data that are transported via said communication network; and based on said analyzing, to perform at least one of:
(I) to determine that a particular server is a malicious infecting web-server that infects multiple accessing devices with a cryptocurrency mining malware;
(II) to determine that a specific server is a malicious Command and Control (C&C) server that commands and controls a distributed bot-net of cryptocurrency mining bots; wherein said analysis comprises:
(a) an analysis of network communications from and to said end-user device, which determines that said end-user device began at a particular time-point to engage in cryptocurrency mining activity;
(b) a backward analysis of prior network communications from and to said end-user device, that occurred prior to said particular time-point of beginning said cryptocurrency mining activity at said end-user device; wherein said backward analysis correlates between (i) said prior network communications from and to said end-user device, and (ii) other network communications exchanged between other end-user devices and a remote server.

27. A method comprising:
monitoring communication network activity of an end-user device that communicates with one or more servers over a communication network;
analyzing packets of data that are transported via said communication network;
based on said analyzing, performing at least one of:
(I) determining that a particular server is a malicious infecting web-server that infects multiple accessing devices with a cryptocurrency mining malware;
(II) determining that a specific server is a malicious Command and Control (C&C) server that commands and controls a distributed bot-net of cryptocurrency mining bots;
wherein the analyzing comprises:
(a) analyzing network communications from and to a first end-user device, and determining that said first end-user device began at a first particular time-point to engage in cryptocurrency mining activity;
(b) analyzing network communications from and to a second end-user device, and determining that said second end-user device began at a second particular time-point to engage in cryptocurrency mining activity;
(c) correlating between (I) prior network communications that involved said first end-user device prior to said first particular time-point, and (II) prior network communications that involved said second end-user device prior to said particular time-point; and based on said correlating, determining that said particular server is the malicious infecting web-server that infects multiple accessing devices with a cryptocurrency mining malware.

28. A method comprising:
monitoring communication network activity of an end-user device that communicates with one or more servers over a communication network;
analyzing packets of data that are transported via said communication network;
based on said analyzing, performing at least one of:
(I) determining that a particular server is a malicious infecting web-server that infects multiple accessing devices with a cryptocurrency mining malware;
(II) determining that a specific server is a malicious Command and Control (C&C) server that commands and controls a distributed bot-net of cryptocurrency mining bots;
wherein the analyzing comprises:
(a) analyzing network communications from and to a first end-user device, and determining that said first end-user device began at a first particular time-point to engage in cryptocurrency mining activity;
(b) analyzing network communications from and to a second end-user device, and determining that said second end-user device began at a second particular time-point to engage in cryptocurrency mining activity;
(c) correlating between (I) prior network communications that involved said first end-user device prior to said first particular time-point, and (II) prior network communications that involved said second end-user device prior to said particular time-point; and based on said correlating, determining that said specific server is the malicious Command and Control (C&C) server that commands and controls a distributed bot-net of cryptocurrency mining bots.

29. A method comprising:
monitoring communication network activity of an end-user device that communicates with one or more servers over a communication network;
analyzing packets of data that are transported via said communication network;
based on said analyzing, performing at least one of:
(I) determining that a particular server is a malicious infecting web-server that infects multiple accessing devices with a cryptocurrency mining malware;
(II) determining that a specific server is a malicious Command and Control (C&C) server that commands and controls a distributed bot-net of cryptocurrency mining bots;
wherein the analyzing comprises
(a) detecting an access of said end-user device to a first server,
(b) detecting that the access of step (a) was followed within a time period T1 by an access of said end-user device to a second server,
(c) detecting that the access of step (b) was followed within a time period T2 by one or more subsequent accesses of said end-user device to said second server;
wherein the detecting of step (b) is performed by:
(b1) detecting a cryptocurrency mining subscription request sent from said end-user device to said second server, wherein the cryptocurrency mining subscription request comprises a first data structure that corresponds to a subscription request of a cryptocurrency mining participant to join a cryptocurrency mining pool;
(b2) subsequently, detecting a cryptocurrency mining subscription response sent to said end-user device from said second server, wherein the cryptocurrency mining subscription response comprises a second data structure that corresponds to a subscription response in which a cryptocurrency mining pool manager approves said subscription request.

30. The method of claim 29,
wherein the detecting of step (c) is performed by:

(c1) detecting a first message sent to said end-user device from said second server, wherein the first message comprises a first data structure that corresponds to an allocation of a cryptographic task for local processing at said end-user device;

(c2) subsequently, detecting a second message sent from said end-user device to said second server, wherein the second message comprises a second data structure that corresponds to a cryptographic outcome of a processed cryptographic task.

* * * * *